United States Patent
Yoshida

(10) Patent No.: US 7,513,842 B2
(45) Date of Patent: Apr. 7, 2009

(54) HYDRAULIC TENSIONER

(75) Inventor: Osamu Yoshida, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 585 days.

(21) Appl. No.: 10/929,141

(22) Filed: Aug. 27, 2004

(65) Prior Publication Data

US 2005/0090343 A1 Apr. 28, 2005

(30) Foreign Application Priority Data

Oct. 28, 2003 (JP) ............................. 2003-367525

(51) Int. Cl.
*F16H 7/08* (2006.01)
(52) U.S. Cl. ...................................... 474/110
(58) Field of Classification Search ................. 474/101, 474/109, 110
See application file for complete search history.

(56) References Cited

U.S. PATENT DOCUMENTS

| | | | | | |
|---|---|---|---|---|---|
| 5,304,099 | A | * | 4/1994 | Deppe et al. ................. | 474/110 |
| 5,704,860 | A | * | 1/1998 | Stief ........................... | 474/110 |
| 5,782,625 | A | * | 7/1998 | Young ......................... | 474/138 |
| 5,911,641 | A | * | 6/1999 | Sheren et al. ................ | 474/109 |
| 5,993,341 | A | * | 11/1999 | Anderson .................... | 474/110 |
| 6,120,402 | A | * | 9/2000 | Preston et al. .............. | 474/109 |
| 6,139,454 | A | * | 10/2000 | Simpson ..................... | 474/110 |
| 6,994,644 | B2 | * | 2/2006 | Yoshida et al. .............. | 474/110 |
| 7,174,799 | B2 | * | 2/2007 | Yoshida et al. .............. | 474/110 |
| 2002/0022541 | A1 | * | 2/2002 | Ullein et al. ................. | 474/110 |
| 2002/0094894 | A1 | * | 7/2002 | Poiret et al. ................. | 474/101 |
| 2004/0266572 | A1 | * | 12/2004 | Yoshida et al. .............. | 474/110 |
| 2005/0096166 | A1 | * | 5/2005 | Wakabayashi et al. ...... | 474/110 |
| 2005/0227799 | A1 | * | 10/2005 | Yoshida ...................... | 474/110 |
| 2005/0265856 | A1 | * | 12/2005 | Yoshida ...................... | 417/362 |
| 2006/0094549 | A1 | * | 5/2006 | Yoshida et al. .............. | 474/110 |

FOREIGN PATENT DOCUMENTS

| | | |
|---|---|---|
| DE | 40 15 708 C1 | 7/1991 |
| EP | 1 223 364 A1 | 7/2002 |
| GB | 1 481 280 A | 7/1977 |
| JP | 11-336855 | 12/1999 |
| JP | 2002-286103 | 10/2002 |

* cited by examiner

*Primary Examiner*—Vicky A Johnson
(74) *Attorney, Agent, or Firm*—Howson & Howson LLP

(57) ABSTRACT

In a hydraulic tensioner, a check valve unit is recessed in a check valve unit-accommodating hole formed at the rear end of a plunger-accommodating hole. A plunger-biasing spring extends into the check valve unit-accommodating hole, and is seated on a flat front surface of the check valve unit. The rear portion of the plunger-biasing spring is prevented from lateral movement by the side wall of the check valve unit-accommodating hole.

2 Claims, 5 Drawing Sheets

HYDRAULIC TENSIONER

FIELD OF THE INVENTION

This invention relates to a hydraulic tensioner having a check valve unit used for applying proper tension to a transmission medium such as a timing belt, a timing chain, or the like, in a vehicle engine.

BACKGROUND OF THE INVENTION

Hydraulic tensioners have been widely used to maintain proper tension in, and prevent vibration of, a transmission medium such as a timing chain, which transmits rotation between a crankshaft and one or more camshafts in a vehicle engine to prevent vibration generated in the travel of the medium and maintain proper tension.

A typical conventional hydraulic tensioner, shown in FIG. 5, is described and depicted in Japanese Laid-open Patent Publication No. Hei-11-336855. As shown in FIG. 5, in the conventional hydraulic tensioner 500, a plunger 520 fits slidably in a plunger accommodating hole 511 formed in a housing 510, hollow interior 521, open at one end, is formed in the plunger 520, and a helical plunger-biasing spring 530, which biases the plunger 520 in the protruding direction, is disposed between a closed end of the plunger-accommodating hole in the housing and the closed end of the hollow interior of the plunger. A high pressure chamber R is formed by the plunger-accommodating hole 511 and the hollow interior 521 of the plunger 520. This high pressure chamber R is filled with oil, supplied under pressure from the engine's lubrication system, through a check valve 540.

The check valve 540 comprises a ball seat 541, a check ball 542 opposite to the ball seat, a cylindrical coil spring 543, which biases the ball toward the seat 541, and a retainer 544, which supports the spring 543, and is held against the bottom portion of the plunger-accommodating hole 511. The check valve allows oil to flow into the high pressure chamber R but blocks flow of oil in the opposite direction.

In the conventional hydraulic tensioner the retainer of the check valve extends into the helical plunger-biasing spring 530, so that the inner diameter of the plunger-biasing spring 530 is limited by the size of the outer diameter of the retainer 544. Therefore, the conventional retainer causes design problems, and prevents decreasing the diameter and reducing the weight of the plunger-biasing spring 530. The conventional retainer also prevents a decrease in the diameter and weight of the plunger 520, since the plunger receives the biasing spring 530 in its hollow interior 521. The presence of the retainer inside the plunger-biasing spring also gives rise to contact resistance due to buckling of the plunger-biasing spring inside the hollow interior 521 of the plunger 520, impairing smooth retracting and extending movement of the plunger 520. Furthermore, the available space in the high pressure chamber R is reduced because most of the check valve extends into the high pressure chamber R. Thus, the amount of oil which can be stored in the high pressure chamber R is limited by the presence of the check valve, and the limitation on the amount of oil in the chamber R adversely affects the tensioner's response characteristics.

Since most of the check valve structure extends into the high pressure chamber R, when there is a possibility that, in the assembly process, the retainer or the ball seat may not be fitted properly into the housing at bottom of the plunger-accommodating hole 511. Unless the retainer and ball seat fit properly in the housing, leakage of oil can occur, which results in troublesome problems.

The principal objects of the invention, therefore are to solve the above-mentioned problems experienced in case of prior art hydraulic tensioners, and to provide a hydraulic tensioner which can be more compact and lighter in weight, capable of smooth retracting and extending movement of the plunger, and exhibiting superior response characteristics.

SUMMARY OF THE INVENTION

The hydraulic tensioner according to the invention comprises a housing having a plunger-accommodating hole having a front end and a rear end, and a plunger slidable in the plunger-accommodating hole and protruding from the front end thereof. The plunger and the plunger-accommodating hole together form a high pressure oil chamber. A helical plunger-biasing spring, disposed the high pressure oil chamber, urges the plunger in a protruding direction. A check valve unit, arranged to allow flow of oil into the high pressure oil chamber but to block reverse flow of oil, is disposed in a hole formed at the rear end of the plunger-accommodating hole and extending rearward therefrom. The check valve unit has a flat front surface with an outer edge, and is positioned so that its flat front surface is recessed rearward from the bottom of the plunger-accommodating hole. The outer diameter of the plunger-biasing spring is such that its rear end does not extend radially outward beyond the outer edge of the flat front surface of the check valve unit, and the rear end of the plunger-biasing spring being seated on the flat front surface of the check valve unit.

The diameter of the check valve unit-accommodating hole is smaller than the diameter of the plunger-accommodating hole, and the diameter of the rear end of the plunger-biasing spring is approximately equal to the diameter of the check valve unit-accommodating hole. The rear end of the plunger-biasing spring fits into the check valve unit-accommodating hole and is restricted against lateral movement by the side wall thereof.

The check valve unit comprises a cylindrical ball seat having an opening for communicating with an oil supply passage, a check ball, movable into contact with the ball seat for closing its opening, a ball-biasing spring urging the check ball toward the ball seat, and a retainer positioning and supporting the ball-biasing spring and limiting the movement of the check ball away from the ball seat.

Because the check valve is recessed in a check valve unit-accommodating hole formed at the rear end of the plunger-accommodating hole, the volume of high pressure chamber can be made larger so that the tensioner has improved response characteristics. Since the rear end of the plunger-biasing spring is seated on a flat surface of the check valve unit, it need not surround the check valve unit, and therefore the spring can have a smaller diameter than that of the conventional plunger-biasing spring. The size of the plunger can also be reduced, and a more compact and less heavy tensioner can be realized. Additionally, the reduction of the diameter of the plunger-biasing spring avoids bending and buckling of the spring and resulting contact resistance. Therefore, smooth retracting and extending movement of the plunger can be realized.

Since the diameter of the check valve unit-accommodating hole is smaller than the diameter of the plunger-accommodating hole, and the rear end of the plunger-biasing spring fits into the check valve unit-accommodating hole, when an impact is imparted to the tip of the plunger, the position of the plunger-biasing spring can be reliably maintained. An annular space, forward of the step formed where the check valve unit-accommodating hole meets the plunger-accommodating hole, receives the outer wall of the plunger as the plunger extends and retracts. The plunger-biasing spring is located inward relative this annular space, and its radial expansion is restricted by the wall of the hole check valve unit-accommodating hole. Consequently, interference between the plunger and the plunger-biasing spring is avoided, and smooth and reliable extension and retraction of the plunger can be realized.

Since the check valve unit comprises a cylindrical ball seat communicating with an oil supply passage, a check ball, which blocks reverse flow of oil by contacting the ball seat, a ball-biasing spring, which biases the check ball toward the ball seat, and a retainer, which positions and supports the ball-biasing spring and limits movement of the check ball, the check valve unit is a simplified integral structure, and can be produced without special machining. Furthermore assembly of the check valve unit and incorporation of the unit into the tensioner can be carried out easily and with accuracy. As a result, the production cost of the tensioner can be significantly reduced.

DETAILED DESCRIPTION OF THE PREFERRED EMBODIMENTS

Briefly, the hydraulic tensioner according to the invention, as in the case of a conventional tensioner, comprises a housing and a plunger, a plunger-biasing spring, and a check valve. In the tensioner of the invention, however, the check valve unit is recessed into a hole which is formed at the rear end of the plunger-accommodating hole. The plunger-biasing spring fits into the check valve unit-accommodating hole, and is seated on flat surface formed on a front wall of the check valve unit. This structure allows the diameters of the plunger-biasing spring and the plunger to be reduced, and therefore, greater compactness and weight reduction in a tensioner can be realized. Moreover, smoother extension and contraction of the plunger, and superior response characteristics can be obtained.

The invention is applicable to various types of hydraulic tensioners. For example, the invention is applicable to a hydraulic tensioner provided with a ratchet mechanism in which a pivoted pawl engages a rack on the plunger to limit retracting movement of the plunger, and is likewise applicable to a hydraulic tensioner having no such ratchet mechanism.

Furthermore, the invention is applicable to tensioners in which the housing comprises both an inner body having the tensioner mechanism, and an outer body though which oil is supplied to the tensioner mechanism, and to tensioners in which the housing is composed of an integral body.

Figure 1:
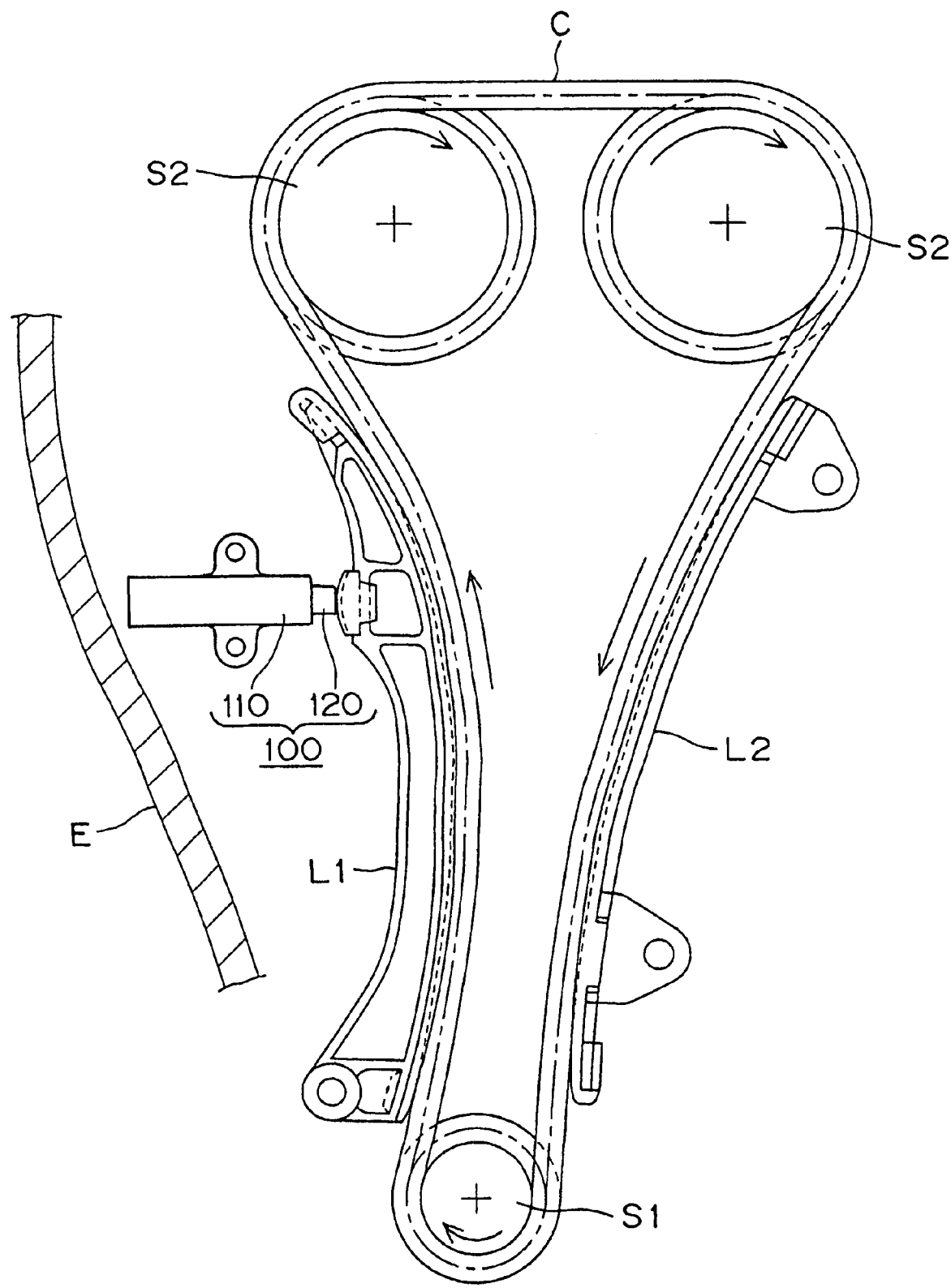
FIG. 1 is a schematic front elevational view of a timing system of a dual cam internal combustion engine incorporating a hydraulic tensioner according to the invention.

As shown in FIG. 1, a hydraulic tensioner 100 in accordance with the invention is attached to an engine body E on the return side of a timing chain C, which is in mesh with a driving sprocket S1 rotated by the crankshaft of an engine, and two driven sprockets S2 respectively on a pair of camshafts. The direction of rotation of the sprockets and the direction of movement of the chain are indicated by arrows. When the driving sprocket S1 rotates, the timing chain C causes the driven sprockets S2 to rotate. The plunger 120 of the tensioner reciprocably protrudes from a front end of the tensioner housing 110, and applies tension to the return side of the chain C through a pivoted lever L1 by pressing against a surface on the back side of the lever remote from the pivot axis, which in FIG. 1 is adjacent the bottom end of the lever. The tension side of the timing chain C slides over a fixed guide L2.

Figure 2:
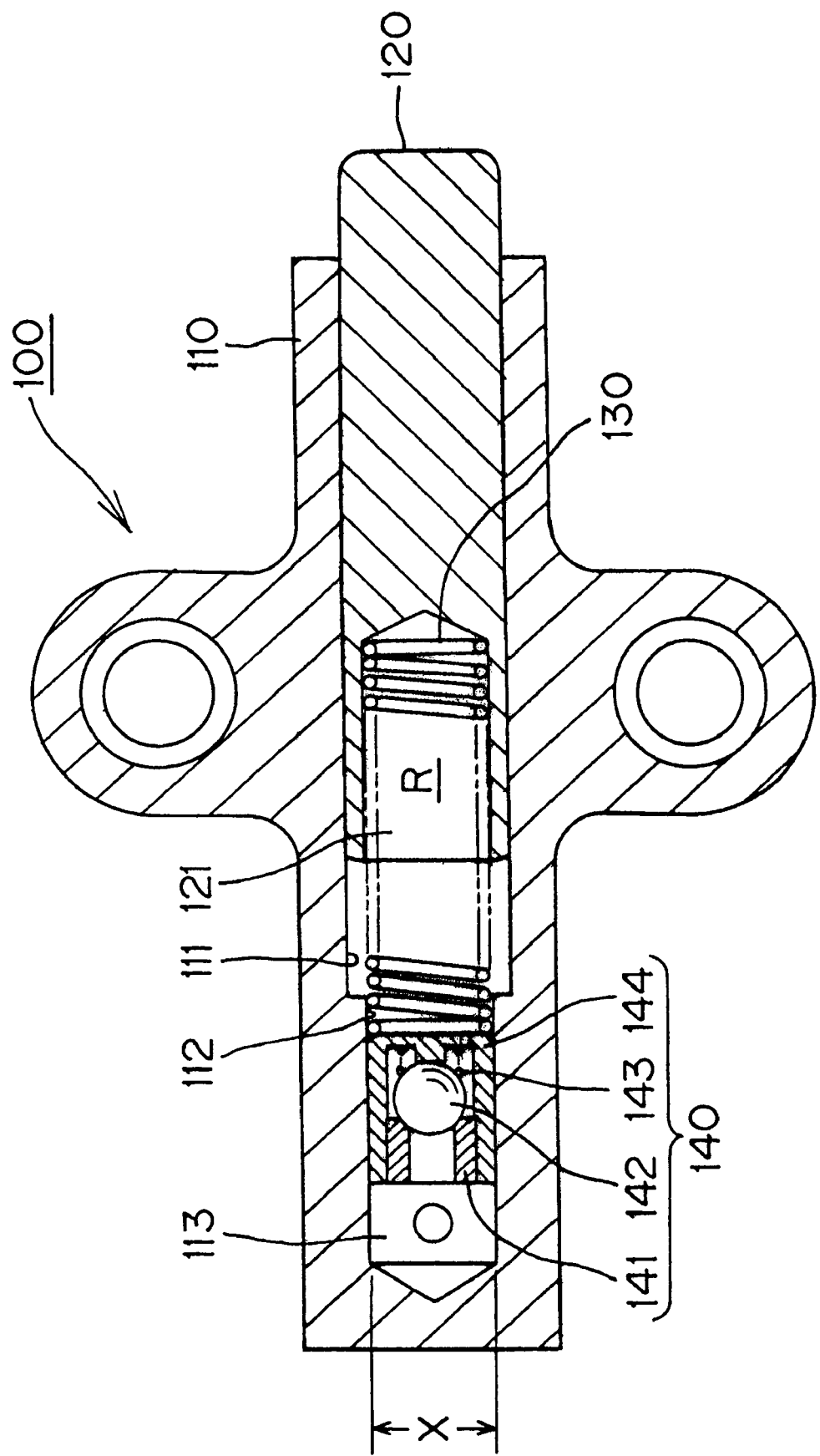
FIG. 2 is a cross-sectional view of a hydraulic tensioner in accordance with a first embodiment of the invention.

In the hydraulic tensioner 100, as shown in FIG. 2, the plunger 120, which has a cylindrical exterior surface, fits slidably into a plunger-accommodating hole 111 in the housing 110. The tip of the plunger is disposed outside the-plunger-accommodating hole 111. The plunger has a hollow interior 121 which is open at one end and closed at its opposite end. The hollow interior receives a plunger-biasing spring 130, which is in compression between the closed end of the hollow interior of the plunger and a check valve unit 140 inside the housing. The spring 130 urges the plunger 120 in the protruding direction.

The plunger-accommodating hole 111 and the hollow interior 121 form a high pressure chamber R, which is filled with oil supplied under pressure from the engine through the check valve unit 140 which allows oil to flow into the high pressure chamber R but blocks reverse flow.

A hole 112, for receiving the check valve unit 140, is formed in the housing 110 as a recess in the bottom of the plunger-accommodating hole. The hole 112 is continuous with the bottom portion of the plunger-accommodating hole 111, but has a diameter X, which is smaller than the diameter of the plunger-accommodating hole 111, so that the rear end of the plunger-biasing spring 130 can fit in the check valve unit-accommodating hole 112 in such a way that the wall of the hole 112 prevents lateral movement of the rear end of spring 130.

Figure 3:
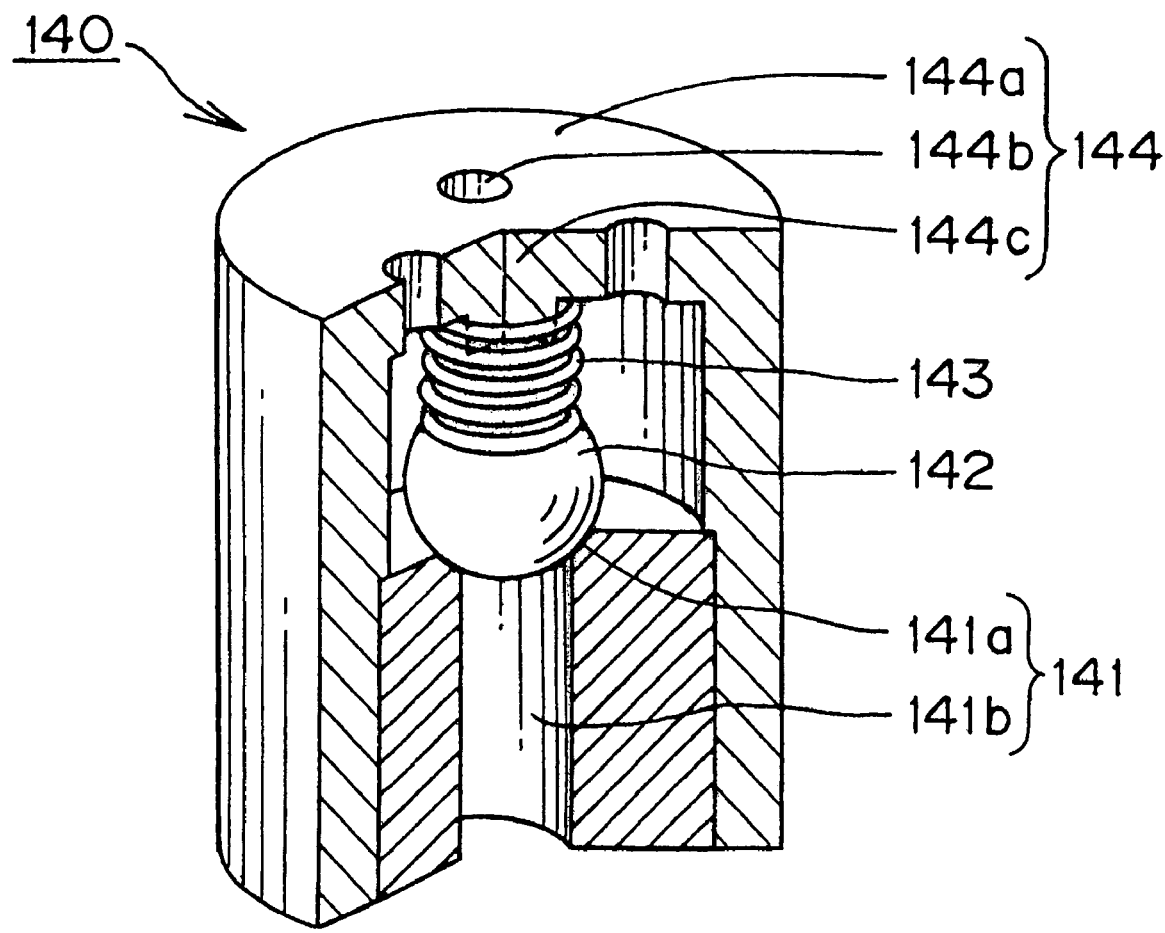
FIG. 3 is a cut-away oblique perspective view of a check valve unit incorporated into the hydraulic tensioner of FIG. 2.

As shown in FIG. 3, the check valve unit 140 comprises a hollow cylindrical retainer 144 having a wall 144a at one end. A cylindrical ball seat 141 adapted to communicate with an oil supply passage 113 (FIG. 2) formed in the housing 110, is press-fit into the open end of the hollow cylindrical retainer 144. The check valve unit includes a check ball 142, which contacts, but is movable away from, the cylindrical ball seat 141 so that it can allow flow of oil in one direction but block the flow of oil in the opposite direction. A ball-biasing spring 143 urges the check ball 142 toward the ball seat 141. The cylindrical retainer 144, has a wall 144a at its end opposite to the open end in which the ball seat 141 is received. The wall has a flat outer surface and plurality of holes 144b, which allow oil to flow into the high pressure oil chamber R (FIG. 2), and a protrusion 144c, which fits into one end the spring 143. The protrusion positions and supports the spring 143, and also limits the movement of the check ball 142.

Thus, the check valve unit 140 has a simple, integral structure comprising only four elements: a check valve body, a check ball, a ball-biasing spring, and a seat press-fit into the check valve body. The body has a circular, cylindrical exterior adapted to be received in a cylindrical check valve unit-accommodating hole.

The plunger-biasing spring 130 has an outer diameter approximately equal to the diameter of the flat outer surface of wall 144a of the check valve unit 140. Because the outer diameter of the spring is substantially the same as the inner diameter X of the check valve unit-accommodating hole 112, the rear end portion of the plunger-biasing spring 130 is reliably seated on the flat outer surface of wall 144a of the check valve unit 140.

When an impact force acts, through lever L1, on the tip of the plunger 120 as a result of fluctuations in the tension of the timing chain C, the plunger is rapidly pressed in he retracting direction against the biasing force of spring 130. The pressure of the oil in the high pressure chamber R increases, and presses the check ball 142 against an annular, spherical, seating surface 141a, formed at one end of the oil passage 141b in the cylindrical ball seat 141. When the check ball 142 is seated, reverse flow of oil from the high pressure chamber R into the oil passage 141b in the ball seat 141 is blocked. As a result, the oil pressure in the high pressure chamber R is further increased, and oil leaks through a small gap between an outer circumferential surface of the plunger 120 and an inner circumferential surface of the plunger-accommodating hole 111, and is discharged to the outside of the tensioner. Thus, the impact force acting on the plunger is absorbed by resistance to the flow of oil through the gap, and vibration of the plunger 120 due to the impact force is quickly attenuated.

In the hydraulic tensioner 100, since the rear end of the plunger-biasing spring 130 is seated on a flat outer surface wall 144a of the check valve unit 140, the diameters of the plunger and the plunger-biasing spring can be reduced, and consequently the tensioner can be more compact lighter in weight. Moreover, since the rear end 130 of the plunger-biasing spring 130 is positioned by fitting into the check valve unit-accommodating hole 112, when an impact is imparted to the tip of the plunger, the position of the plunger-biasing spring 130 can be reliably maintained. An annular space, forward of the step formed where the check valve unit-accommodating hole 112 meets the plunger-accommodating hole 111, allows extension and retraction of the plunger 120. The spring 130 is located inward relative this annular space, and its radial expansion is restricted by the wall of the hole 112. Consequently, interference between the plunger and the plunger-biasing spring is avoided, and extension and retraction of the plunger is smooth and reliable.

Furthermore, since the check valve unit is a simplified integral structure, it can be produced without special machining, and assembly of the check valve unit and incorporation of the unit into the tensioner can be carried out easily and with accuracy. As a result, the production cost of the tensioner can be significantly reduced.

Figure 4:
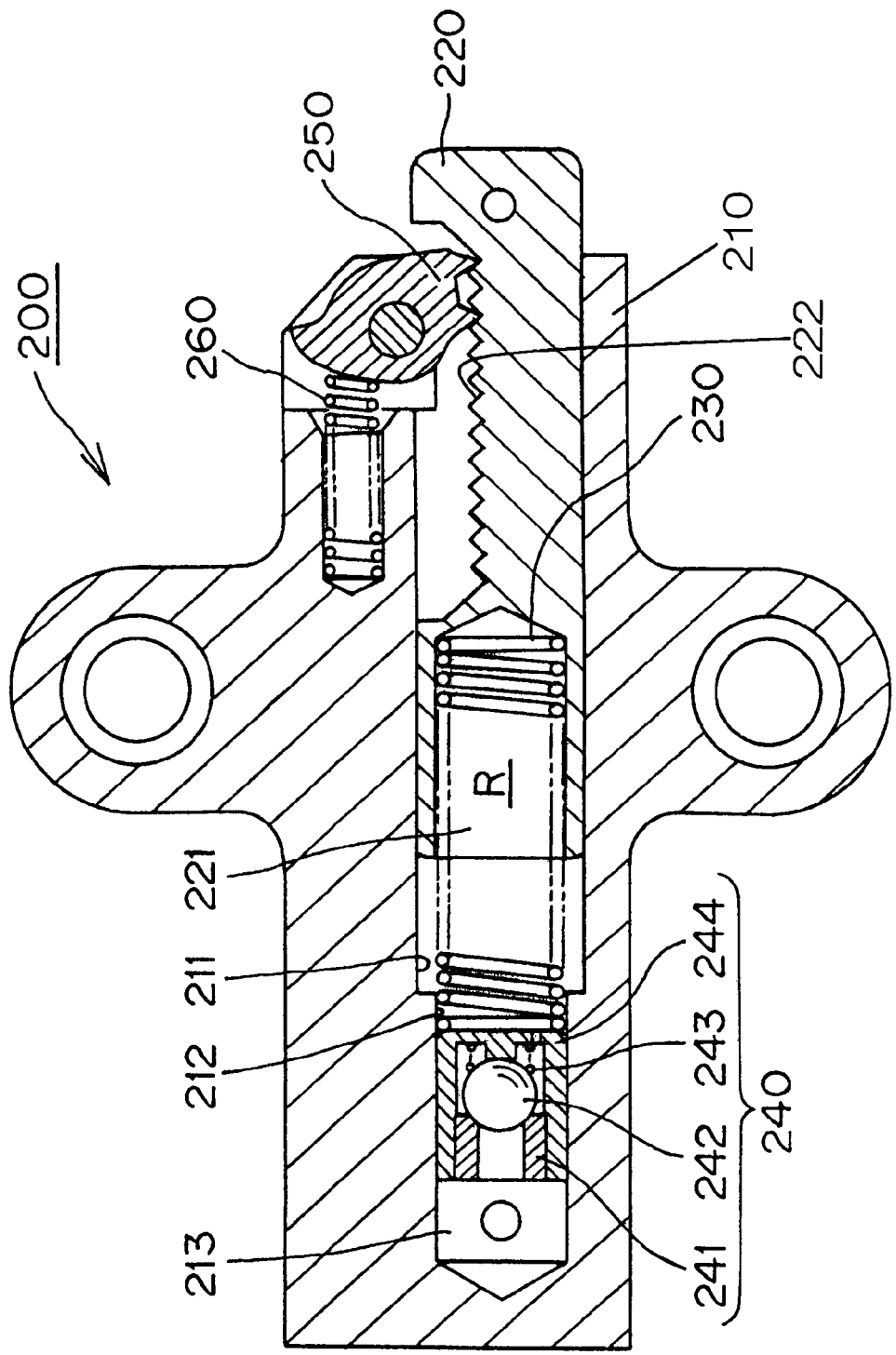
FIG. 4 is a cross-sectional view of a hydraulic tensioner in accordance with another embodiment of the invention.
Figure 5:
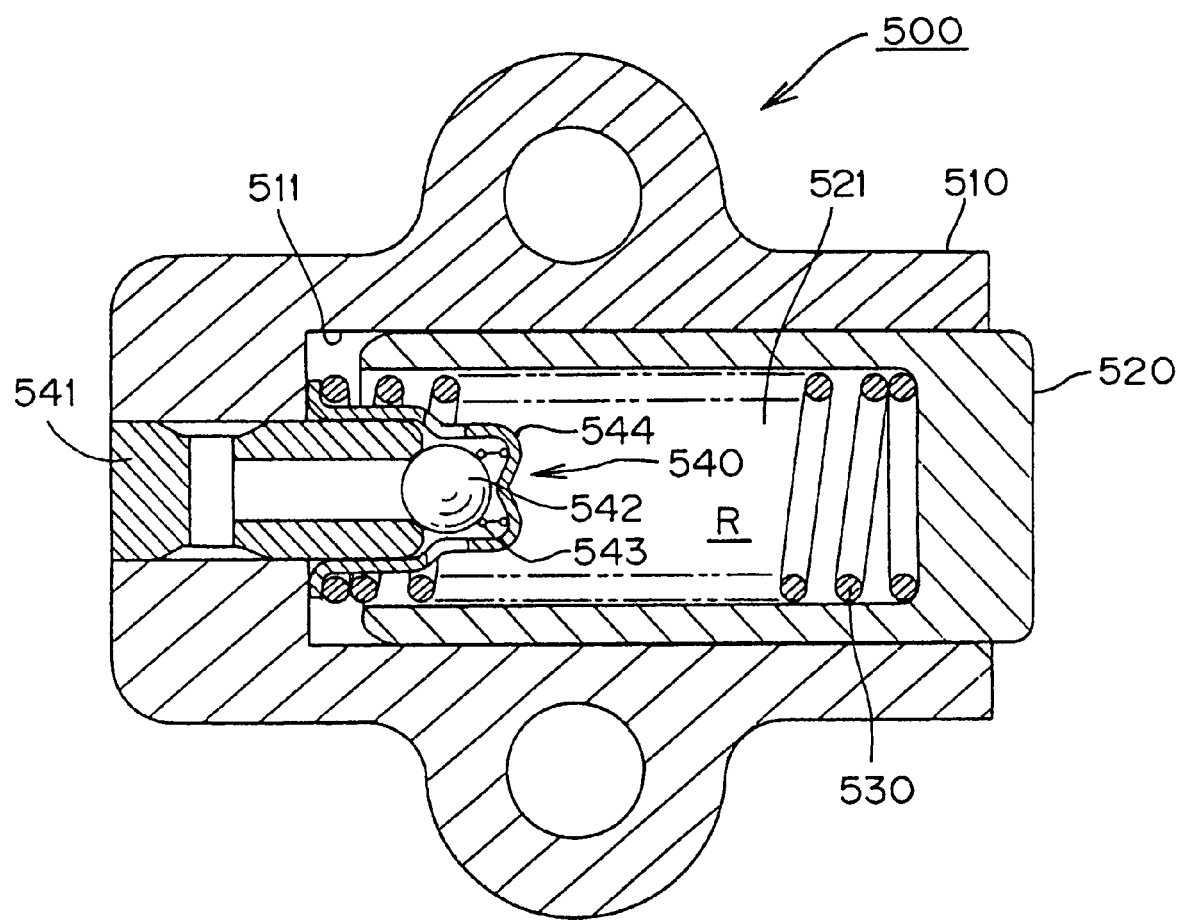
FIG. 5 is a cross-sectional view of a conventional hydraulic tensioner.

The hydraulic tensioner 200, shown in FIG. 4 is also designed for attachment to an engine body. It is different from the hydraulic tensioner 100 in that it includes a ratchet mechanism, in which the engagement of a rack 222 on plunger 220 with a pawl 250 pivoted on the tensioner housing 210, blocks retracting movement of the plunger 220. A ratchet biasing spring 260 biases the pawl 250 toward the rack 222. Otherwise, the configuration of tensioner 200 is substantially the same as that of tensioner 100. Parts in the tensioner of FIG. 4 that correspond to parts in the tensioner of FIG. 2, are designated by reference numbers that exceed the reference numbers in FIG. 2 by one hundred.

As in the case of the tensioner of FIG. 2, the tensioner 200, which includes a ratchet mechanism, can be made more compact and lighter in weight than a conventional ratchet-type hydraulic tensioner, because the diameter of the plunger can be reduced. Moreover, as in the case of the tensioner of FIG. 2, smooth extension and retraction, and excellent response characteristics are exhibited.

I claim:

1. A hydraulic tensioner comprising a housing having a plunger-accommodating hole having a front end and a rear end, said hole having a bottom surface at said rear end, the bottom surface facing toward the front end, a plunger slidable in said plunger-accommodating hole and protruding from the front end thereof, said plunger and said plunger-accommodating hole together forming a high pressure oil chamber, a helical plunger-biasing spring within said high pressure oil chamber, said spring having front and rear ends and urging the plunger in a protruding direction, a check valve unit-accommodating hole formed at the rear end of the plunger-accommodating hole and extending rearward from said bottom surface, said check valve unit-accommodating hole being narrower than the plunger-accommodating hole in at least one direction perpendicular to the direction of sliding of the plunger, and the check valve unit-accommodating hole having a circular cylindrical side wall, the circular cylindrical side wall having a forward end adjacent said bottom surface of the plunger-accommodating hole and a rearward end spaced rearward from said forward end, and a check valve unit disposed entirely within said check valve unit-accommodating hole, said check valve unit being arranged to allow flow of oil into said high pressure oil chamber but to block reverse flow of oil, the check valve unit having a flat frontmost surface with an outer edge, and being positioned so that said flat frontmost surface is recessed rearward from the bottom surface of the plunger-accommodating hole and from the forward end of said circular cylindrical side wall, the outer diameter of said plunger-biasing spring being sustantially equal to the diameter of the circular cylindrical side wall of the check valve unit-accommodating hole such that the rear end of the plunger-biasing spring does not extend radially outward beyond the outer edge of said flat frontmost surface of the check valve unit, and said rear end of the plunger-biasing spring being seated on said flat frontmost surface of the check valve unit, in which the plunger-accommodating hole and the check valve unit-accommodating hole both have circular cross-sections, the diameter of said check valve unit-accommodating hole is smaller than the diameter of the plunger-accommodating hole, and said rear end of the plunger-biasing spring fits into said check valve unit-accommodating hole and is prevented from lateral movement by engagement of a portion of said spring, adjacent said rear end of the spring, with the circular cylindrical side wall of said check valve unit-accommodating hole.

2. The hydraulic tensioner according to claim 1, in which said check valve unit comprises a cylindrical ball seat having an opening for communicating with an oil supply passage, a check ball, movable into contact with said ball seat for closing said opening, a ball-biasing spring urging the check ball toward the ball seat, and a retainer positioning and supporting said ball-biasing spring and limiting the movement of the check ball away from the ball seat.

* * * * *

UNITED STATES PATENT AND TRADEMARK OFFICE
CERTIFICATE OF CORRECTION

| | | |
|---|---|---|
| PATENT NO. | : 7,513,842 B2 | Page 1 of 1 |
| APPLICATION NO. | : 10/929141 | |
| DATED | : April 7, 2009 | |
| INVENTOR(S) | : Yoshida | |

It is certified that error appears in the above-identified patent and that said Letters Patent is hereby corrected as shown below:

On the Title Page

Item [*] Notice: Subject to any disclaimer, the term of this patent is extended or adjusted under 35 USC 154(b) by 585 days Delete the phrase "by 585 days" and insert -- by 824 days --

Signed and Sealed this

Sixth Day of April, 2010

David J. Kappos
*Director of the United States Patent and Trademark Office*